(12) United States Patent
Warner et al.

(10) Patent No.: US 8,684,308 B2
(45) Date of Patent: Apr. 1, 2014

(54) UNIVERSAL ARRANGEMENT FOR RECEIVING A CURTAIN RAIL FOR A PARTITIONING CURTAIN

(75) Inventors: Holger Warner, Jork (DE); Andreas Neumann, Hamburg (DE); Michael Mosler, Plaisance Du Touch (FR)

(73) Assignee: Airbus Operations GmbH (DE)

( * ) Notice: Subject to any disclaimer, the term of this patent is extended or adjusted under 35 U.S.C. 154(b) by 608 days.

(21) Appl. No.: 12/933,197

(22) PCT Filed: Feb. 12, 2009

(86) PCT No.: PCT/EP2009/051631
§ 371 (c)(1),
(2), (4) Date: Nov. 8, 2010

(87) PCT Pub. No.: WO2009/115378
PCT Pub. Date: Sep. 24, 2009

(65) Prior Publication Data
US 2011/0042434 A1 Feb. 24, 2011

Related U.S. Application Data

(60) Provisional application No. 61/069,937, filed on Mar. 19, 2008.

(30) Foreign Application Priority Data

Mar. 19, 2008 (DE) .......................... 10 2008 014 929

(51) Int. Cl.
*B64D 11/00* (2006.01)
*B64D 13/00* (2006.01)

(52) U.S. Cl.
USPC ...................................................... 244/118.5

(58) Field of Classification Search
USPC ...................................................... 244/118.5
See application file for complete search history.

(56) References Cited

U.S. PATENT DOCUMENTS

| 2,710,731 | A | | 6/1955 | Bright et al. |
| 2,752,864 | A | * | 7/1956 | McDougal, Sr. et al. ...... 410/130 |
| 3,782,758 | A | * | 1/1974 | Williamson, III ............ 410/118 |

(Continued)

FOREIGN PATENT DOCUMENTS

| DE | 4119623 C1 | 10/1992 |
| DE | 10080841 | 5/2004 |

(Continued)

*Primary Examiner* — Tien Dinh
*Assistant Examiner* — Michael A Fabula
(74) *Attorney, Agent, or Firm* — Lerner, David, Littenberg, Krumholz & Mentlik, LLP

(57) ABSTRACT

An arrangement for receiving a curtain rail for a curtain for partitioning at least two regions in a cabin of a vehicle includes a bottom facing the floor of the cabin, and a top facing the ceiling of the cabin. The bottom is essentially planar and is designed to receive the curtain rail. The top is designed to cover the space between a curtain held in the curtain rail and the ceiling of the cabin of the vehicle. The bottom includes means for the variable-position holding of attachment points to which the curtain rail can be fastened. Consequently the curtain rails can be affixed flexibly and so as to be subsequently changeable within the region of the arrangement, thereby contributing to such arrangements so as to be able to be standardized for a multitude of imaginable cabin layouts of a vehicle, to be able to minimize individual customization work and construction expenditure.

7 Claims, 8 Drawing Sheets

(56) References Cited

U.S. PATENT DOCUMENTS

Figure 1:
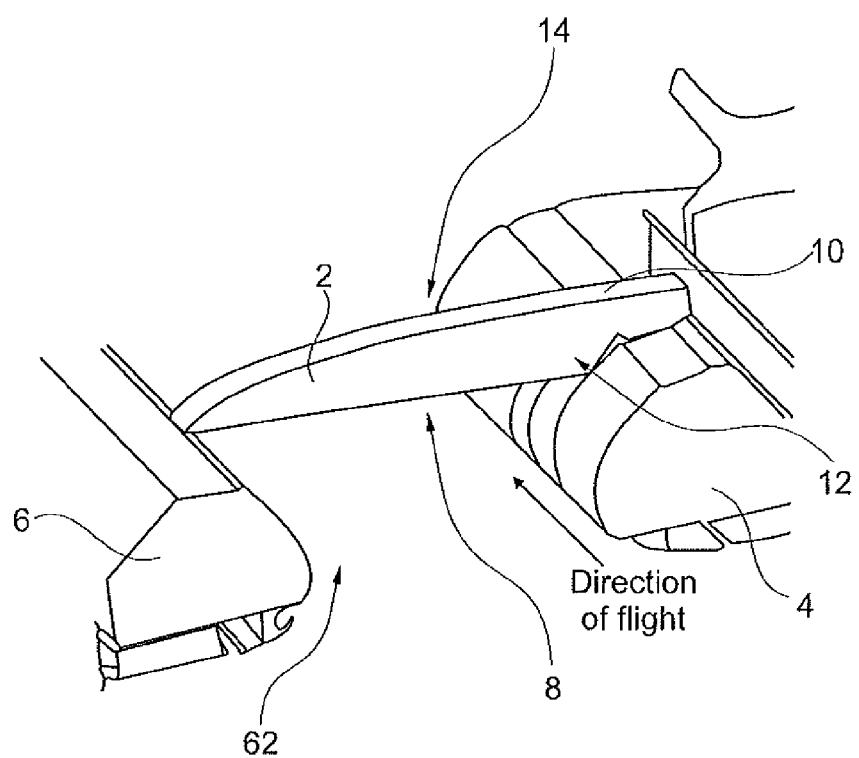

| | | | | |
|---|---|---|---|---|
| 3,911,991 | A | * | 10/1975 | Malferrari .................. 160/202 |
| 3,931,994 | A | | 1/1976 | Palmiter |
| RE28,788 | E | * | 4/1976 | Williamson, III ............ 410/118 |
| 4,014,071 | A | * | 3/1977 | Janson ......................... 16/93 R |
| 4,023,235 | A | * | 5/1977 | Cohen et al. .................. 16/94 D |
| 4,072,179 | A | * | 2/1978 | Naito ........................... 160/197 |
| 4,102,008 | A | * | 7/1978 | Janson ......................... 16/96 R |
| 4,103,393 | A | * | 8/1978 | Janson ......................... 16/94 R |
| 4,166,306 | A | * | 9/1979 | Janson ......................... 16/94 R |
| 4,185,799 | A | | 1/1980 | Richards, Jr. |
| 4,639,031 | A | * | 1/1987 | Truckenbrodt ............ 296/24.41 |
| 4,826,236 | A | * | 5/1989 | Bennett ...................... 296/186.2 |
| 5,086,540 | A | * | 2/1992 | Schumacher .............. 16/87.4 R |
| 5,109,910 | A | * | 5/1992 | Tortorella et al. ............ 160/197 |
| 5,165,626 | A | * | 11/1992 | Ringger et al. ............ 244/118.5 |
| 5,816,534 | A | * | 10/1998 | Schumacher ................. 244/119 |
| 6,523,779 | B1 | * | 2/2003 | Michel ........................ 244/118.5 |
| 7,530,529 | B2 | * | 5/2009 | Bock ........................... 244/118.5 |
| 8,550,143 | B2 | * | 10/2013 | Breuer et al. ............. 160/323.1 |
| 2006/0032155 | A1 | | 2/2006 | Thomassin et al. |
| 2008/0012370 | A1 | * | 1/2008 | Brussard .................... 296/24.41 |
| 2008/0313964 | A1 | * | 12/2008 | Michel ........................... 49/409 |
| 2009/0050280 | A1 | * | 2/2009 | Morris et al. ................. 160/345 |
| 2012/0112505 | A1 | * | 5/2012 | Breuer et al. ................ 297/217.1 |
| 2012/0234976 | A1 | * | 9/2012 | Neumann et al. ............. 244/131 |

FOREIGN PATENT DOCUMENTS

| | | |
|---|---|---|
| DE | 202007013134 U1 | 11/2007 |
| EP | 0407767 A2 | 1/1991 |
| EP | 1619120 A1 | 1/2006 |

* cited by examiner

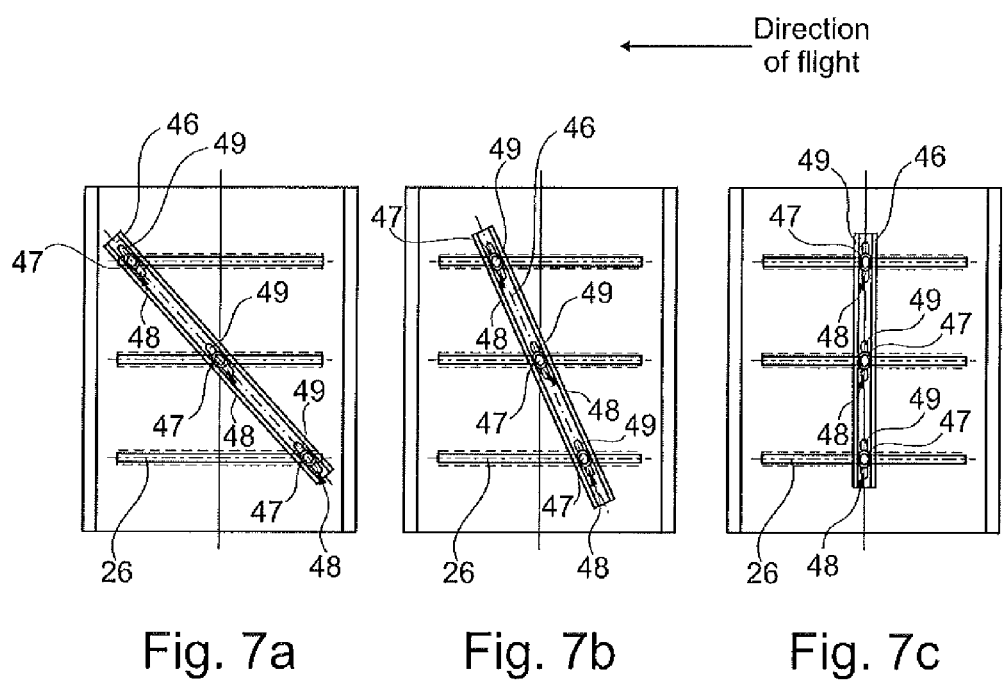

UNIVERSAL ARRANGEMENT FOR RECEIVING A CURTAIN RAIL FOR A PARTITIONING CURTAIN

CROSS-REFERENCE TO RELATED APPLICATIONS

This application is a national phase entry under 35 U.S.C. §371 of International Application No. PCT/EP2009/051631, filed Feb. 12, 2009, published in German, which claims the benefit of the filing date of U.S. Provisional Patent Application No. 61/069,937 filed Mar. 19, 2008 and of German Patent Application No. 10 2008 014 929.2 filed Mar. 19, 2008, the disclosures of which applications are hereby incorporated herein by reference.

FIELD OF THE INVENTION

The invention relates to an arrangement for receiving a curtain rail for a curtain for partitioning at least two regions in a cabin of a vehicle.

TECHNOLOGICAL BACKGROUND OF THE INVENTION

Such arrangements, which are also known as header panels or curtain headers, are, for example, used in an aircraft cabin to receive a curtain rail, and at the same time to create a vision-blocking and/or light blocking partition between the upper edge of a partition curtain, which is guided in the curtain rail, and the cabin ceiling situated above it. Normally the arrangement comprises trim panels that cover the space between the curtain rail and the cabin ceiling on both sides at least to the upper edge of the curtain. Apart from their function as a privacy shield and as a place for information signs, the trim panels often have no other function, so that the space arising between the trim panels is basically wasted.

Aircraft-operator-specific designs of the aircraft cabin lead to different installation requirements relating to a curtain rail, wherein the curtain rail could, for example, be installed between two monuments (the term "monument" refers, for example, to an aircraft galley, an aircraft toilet, or a stowage compartment), between a monument and a partition wall, or between two partition walls. Accordingly, numerous different curtain rail designs and thus also a multitude of possible curtain header contours exist. This results, in particular, in a situation wherein in the state of the art no standardised solutions for the design of such curtain headers exist, and a predominant fraction of all examples installed in aircraft cabins relates to completely new designs. This results in very considerable design and manufacturing expenditure, in diminished flexibility in the reconfiguration of an aircraft cabin in the regions between two cabin zones as well as in any subsequent change in the cabin configuration, and in some cases in the necessity to construct new curtain headers. Furthermore, in their design during the construction phase, late changes are difficult and costly if manufacturing preparations have already been made.

SUMMARY OF THE INVENTION

It is thus the object of the invention to propose an arrangement for receiving a curtain, which arrangement is standardised to the greatest extent possible and which allows quick and flexible adaptation to various cabin configurations. It is a further object of the invention to propose an arrangement in which the space arising between the lateral panels above a curtain rail that forms part of the curtain header can be used in an efficient manner.

In contrast to the situation in the state of the art, in the arrangement according to the invention (or with other words: in the curtain header according to the invention) it is proposed that the area for receiving a curtain rail be dimensioned so as to be significantly larger than required by the curtain rail. The arrangement can be placed in a passage region in the cabin, in which region a curtain is to be used. It is then possible to affix a curtain rail in various positions and angles on the arrangement according to the invention so that said curtain rail can meet the respective requirements relating to the position and angle, for example between two monuments. In the arrangement according to the invention it is not only possible to use essentially straight curtain rails, but also to integrate more elaborately formed curtain rails even in the subsequently provided retrofitting of a reconfigured cabin with correspondingly designed dimensions of the arrangement according to the invention, which could, for example, be necessary in the case of new fixtures, or fixtures that are displaced relative to each other, of a new cabin layout.

In a particularly advantageous improvement the arrangement according to the invention comprises at least one component that comprises an essentially planar face for receiving a curtain rail, and provides at least two variable attachment points for a curtain rail to be received. Preferably, these attachment points are designed so as to be slidable within the component along at least one dimension, which is, for example, implemented by rails with countersunk screw-on bodies or screw-on points. In a particularly preferred embodiment the component comprises a total of three rails, in which rails screw-on points are slidably held, into which screw-on points, by means of corresponding sliding of the screw-on points within the rails to the provided end positions, a curtain rail can be screwed that can be formed almost in any desired manner. When tightening the fastening screws of the curtain rail in the screw-on points, the screw-on points are preferably affixed within the rails of the component so that the curtain rail, while being completely variable, nevertheless can be firmly screwed to the arrangement according to the invention.

Above the component according to the invention—to the extent that said component is designed as a component that is planar at least in some regions—one or several trim components for covering the space between the component and the cabin ceiling follow. However, it is also possible to design the component in such a manner that while it is designed so as to be planar on the receiving face for the curtain rail, towards the top of the cabin ceiling it also fulfils the function of normal trim components. To this effect it is imaginable that the component extends upwards to the cabin ceiling, and between the planar receiving face and the upwards-extending components forms approximately a right angle. Other angles can also be implemented; they depend on the design selected by the aircraft operator; however, good legibility of information signs on inclined surfaces should be provided.

In a particularly preferred embodiment the arrangement according to the invention comprises a hollow space above the receiving face for the curtain rail, which hollow space extends right through to the cabin ceiling and is laterally delimited by trim components or sidewalls of the component. This hollow space, which can, for example, be closed off by means of a cover or other closing means, will provide an additional stowage compartment for receiving objects that, for example, have to be made available for access by flight attendants. For example, this may relate to demonstration kits for demonstrating the fastening and releasing of seat belts, to first aid equipment, blankets and pillows, life jackets, personal belongings and the like.

Overall, the invention proposes an advantageous arrangement for receiving a curtain for partitioning at least two cabin regions, which curtain header can be used in a completely flexible manner with a host of different curtain rails in a multitude of installation positions.

SHORT DESCRIPTION OF THE FIGURES

Figure 2:
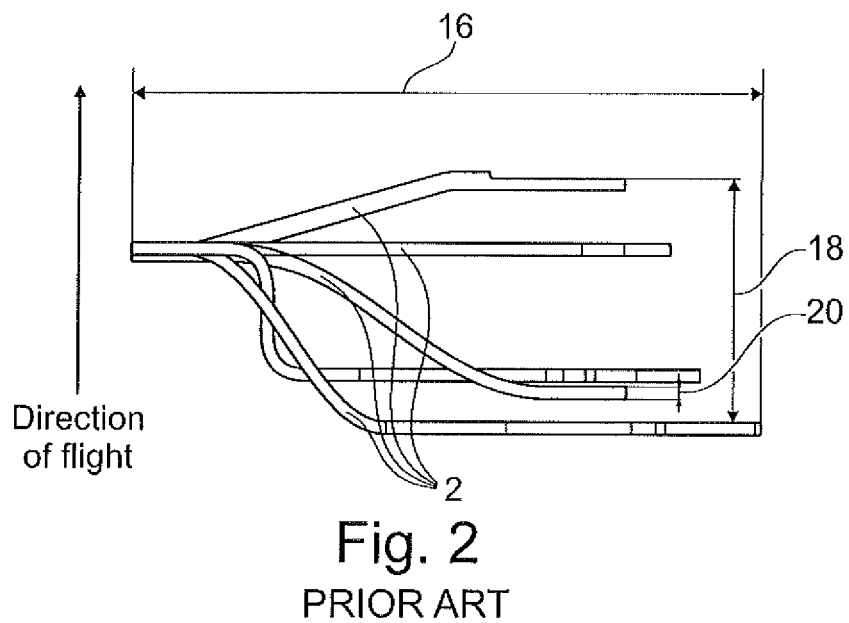
Figure 3:
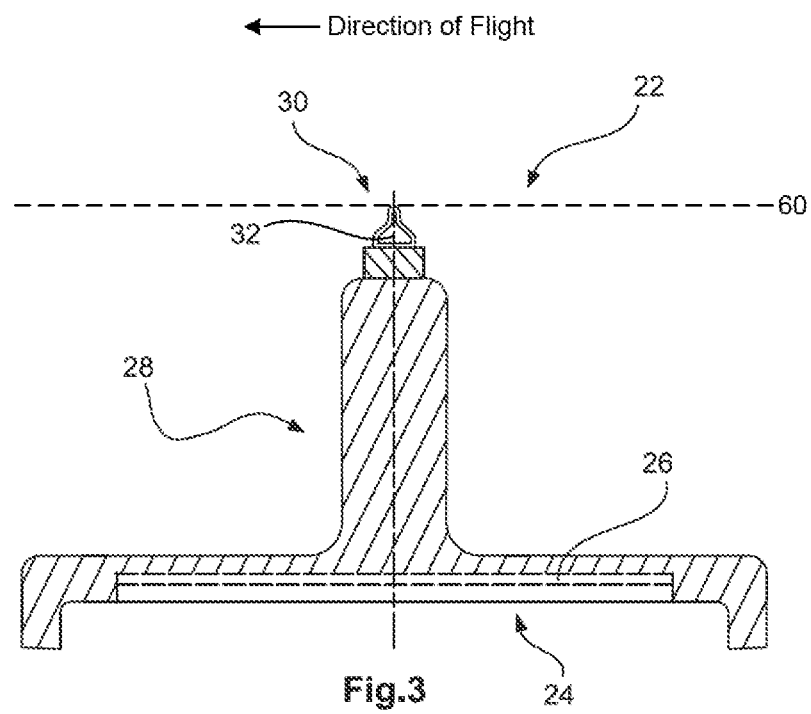
Figure 4:
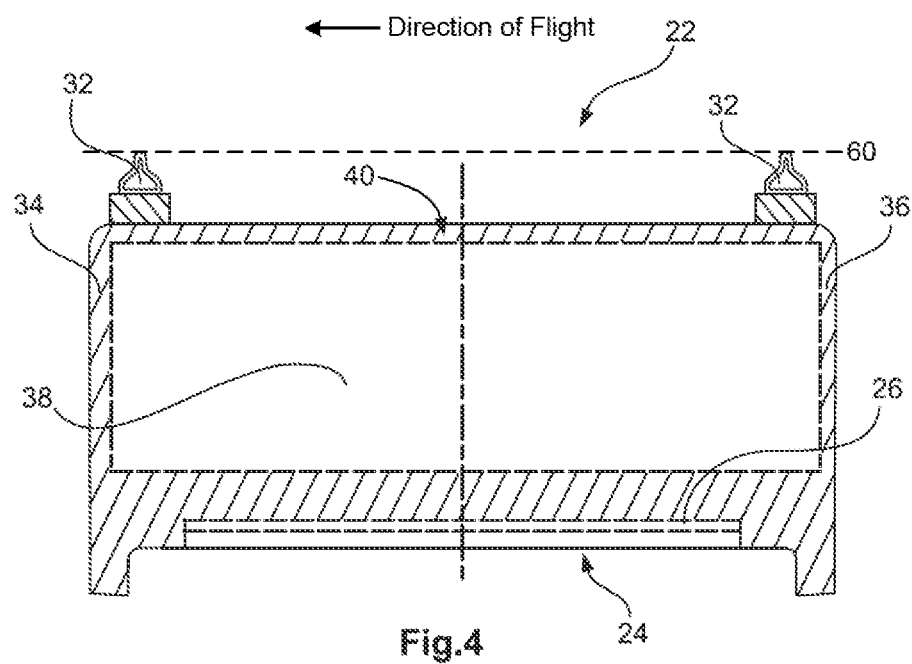
Figure 5:
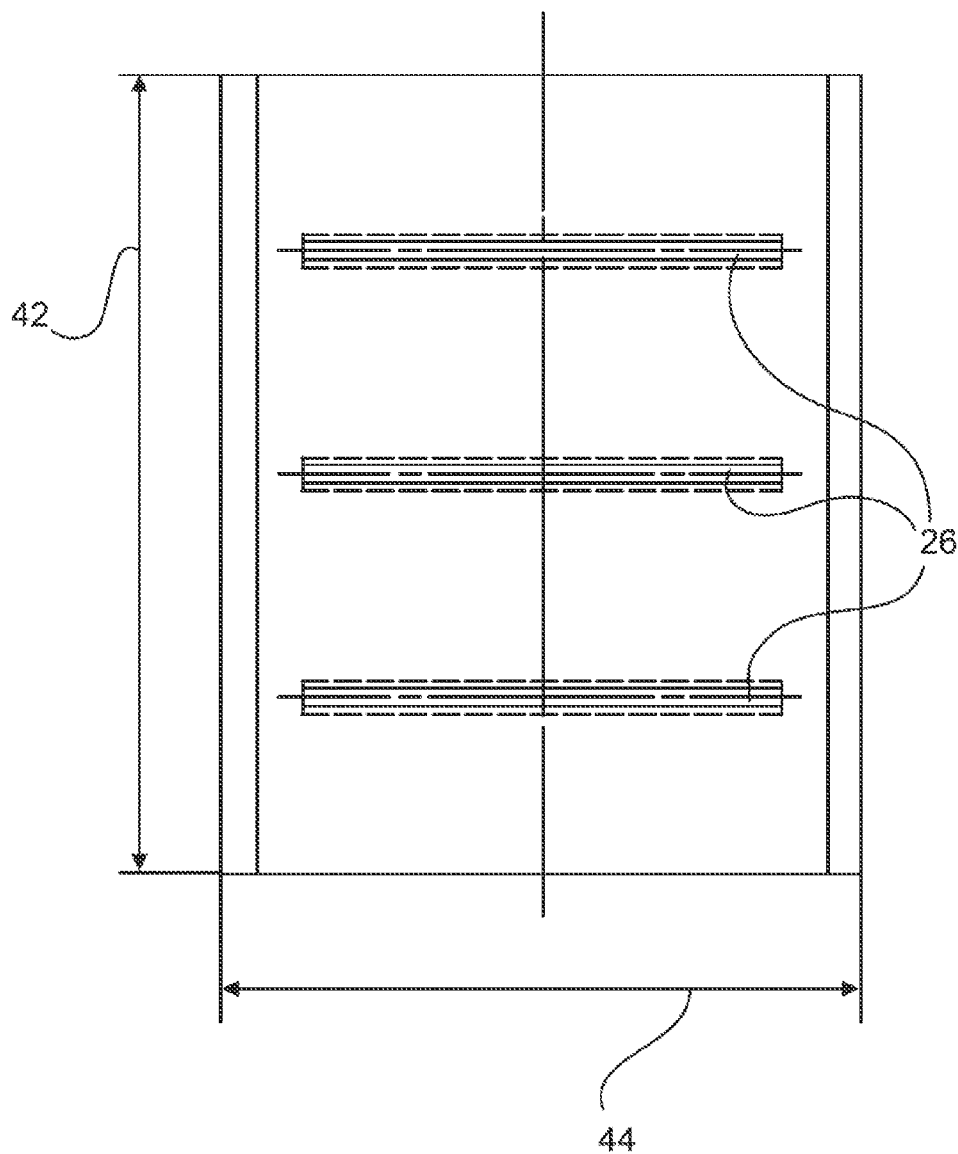
Figure 6:
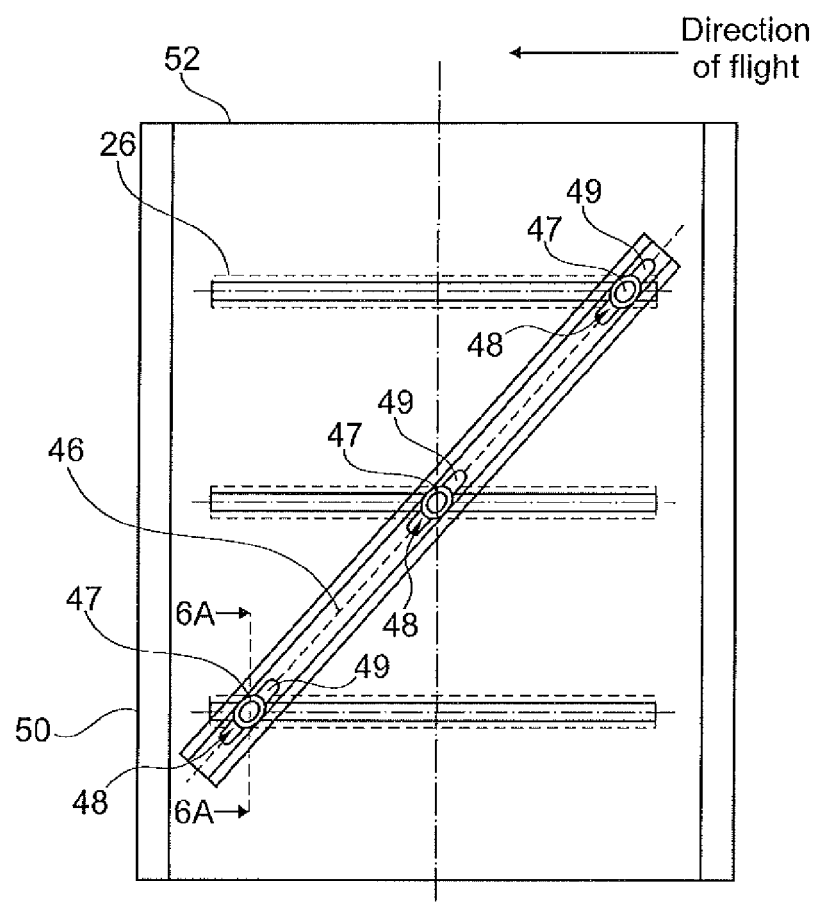
Figure 6A:
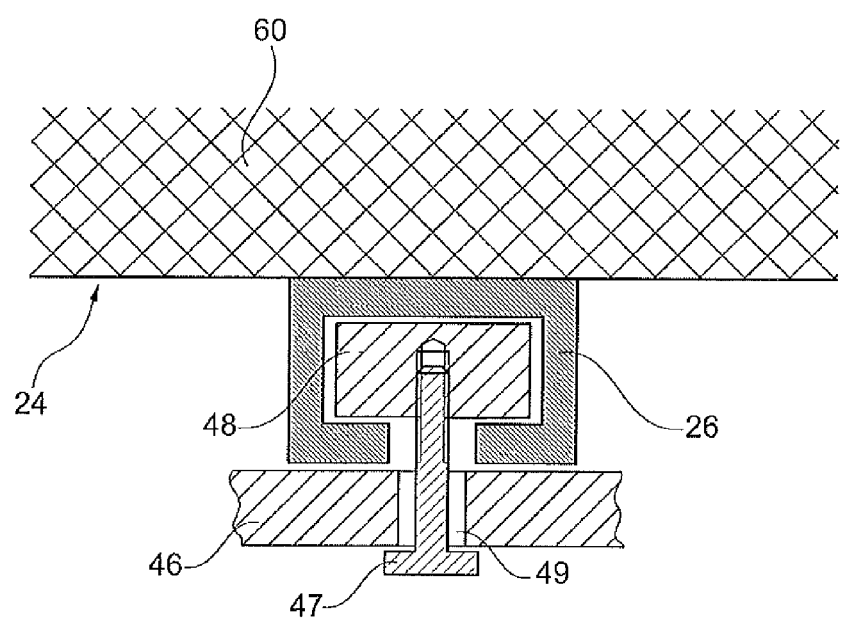
Figure 8:
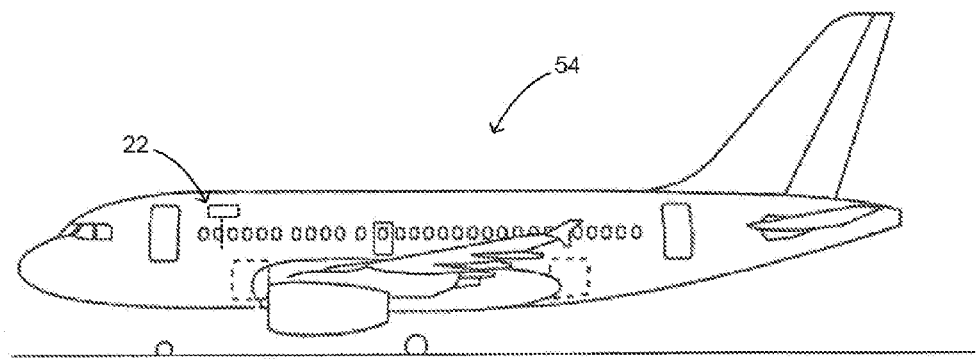

Below, the invention is explained in more detail with reference to the figures. In the figures the same reference characters are used for identical objects. The following are shown:

FIG. 1: an arrangement for receiving and covering up the fittings of a curtain in an aircraft cabin from the state of the art;

FIG. 2: a selection of different curtain rails in the state of the art;

FIG. 3: a first exemplary embodiment of the arrangement according to the invention;

FIG. 4: a secondary exemplary embodiment of the arrangement according to the invention, with a stowage compartment function;

FIG. 5: a bottom view of the partitioning arrangement according to the invention;

FIG. 6: a bottom view of the partitioning arrangement according to the invention, with a built-in curtain rail;

FIG. 6A: a cross-sectional view as seen along the line 6A-6A in FIG. 6;

FIGS. 7A to 7C: a bottom view of the partitioning arrangement for receiving a curtain with an installed curtain rail in several positions; and FIG. 8: an aircraft with an arrangement for receiving and covering the fittings of a curtain, illustrated schematically.

DETAILED DESCRIPTION OF EXEMPLARY EMBODIMENTS

FIG. 1 shows a conventional arrangement 2 for receiving a curtain or a curtain rail from the state of the art, which arrangement is commonly also known as header panel or curtain header. In the embodiment shown, the arrangement 2 is arranged between two overhead stowage compartments or hatracks 4 and 6. The bottom 8 of the arrangement 2 is planar and is used to receive a curtain rail for holding a curtain that is used to partition at least two cabin regions. The top 10 of the arrangement 2 is curved and preferably conforms to the cabin ceiling so that, together with the curtain, completely light-blocking and vision-blocking partitioning of two cabin regions from the cabin ceiling to the cabin floor can be created. The faces 12 and 14 of the arrangement 2 are formed by trim panels, on which it is also possible to arrange information signs and the like.

Since the installation positions of such an arrangement 2 (of such a curtain header, that is) depend on the cabin layout of the aircraft, an almost unlimited number of different arrangements 22 are imaginable, as illustrated with reference to the contour arrangements in FIG. 2. The arrangements 2 shown—with one exception—are curved, angled, or they are curved overall. The lateral extension 16 across the direction of flight, as well as the extension in longitudinal direction 18 parallel to the direction of flight, is different in all the arrangements 2 shown. Accordingly, if in the cabin configuration there is a rearrangement or reconfiguration of monuments, partition walls or other fixtures, a new curtain rail and thus a new arrangement 2 for receiving and covering this curtain rail becomes necessary, which arrangement 2 comprises a new extension in longitudinal direction 18 or in lateral direction 16. Furthermore, the thicknesses 20 of the arrangements 2 at times also differ, and consequently each installation situation results in an individually designed arrangement 2.

FIG. 3 shows an arrangement 22 according to the invention for receiving and covering a curtain rail 22, with the cross section of said curtain header 22 being shown parallel to the direction of flight. The arrangement 22 according to the invention is planar at its bottom 24, where several rails 26 for variable fastening of a curtain rail are arranged. The rails 26 preferably extend parallel to the direction of flight and extend over a significant region of the arrangement 22 according to the invention in the direction of flight. Screw-on points (not shown in the illustration of FIG. 3) can be introduced to the rails 26, which screw-on points are held so as to essentially be slidable along the rails 26. Screws, studs or other threaded fasteners can be screwed into these screw-on points, which fasteners can fasten a curtain rail by the screw-on points. By fastening the curtain rail by these screw-on points, the screw-on points are fastened within the rails 26 and thereafter are arranged so as to be fixed in the rails 26 until the screw arrangement is undone.

Above the essentially planar bottom 24, the arrangement 22 according to the invention extends upwards in the direction of the cabin ceiling 60. This region 28 serves as a privacy shield between a curtain held in the curtain rail and the cabin ceiling 60. The top of the arrangement 22 according to the invention should therefore be designed in such a manner that it conforms to the cabin ceiling 60. To this effect, for this reason a type of sealing rubber or a ceiling lip 32 may be applied, which assists the upper region 28 of the curtain header 22 according to the invention in conforming to the cabin ceiling 60.

FIG. 3 shows an arrangement 22 according to the invention which merely serves as a privacy shield and as an arrangement for holding a curtain. In contrast to this, FIG. 4 shows an arrangement 22 according to the invention, which arrangement 22 is not only used for holding a curtain rail and as a privacy shield, but can also be used as a stowage compartment. For this reason the upper region 28 of FIG. 3 has been widened so that between two lateral walls 34 and a hollow space 38 extends, which in the embodiment shown is closed off towards the top to the cabin ceiling 60 by a cover panel 40. On both sides of this cover panel 40 there are rubber seals 32, which in this arrangement too make it possible for the curtain header 22 according to the invention to be flush with the cabin ceiling 60. The hollow space 38 could, for example, be closed off from the cabin by covers or other closing means; said hollow space could preferably be used by the cabin crew for storing personal belongings or other objects, for example demonstration kits, first-aid kits and the like.

FIG. 5 shows the bottom 24 of an arrangement 22 according to the invention which as an example comprises three rails 26 for receiving a curtain rail. The three rails 26 extend essentially parallel to each other and with equidistant spacing from each other. The extension in lateral direction 42 of the arrangement 22 according to the invention should preferably correspond to the lateral extension 16 of the curtain headers 2 shown in FIG. 2. If this is necessary at the time of integration into the cabin, an arrangement 22 according to the invention can be slightly shortened to a correspondingly installable width 42. In this arrangement the extension in longitudinal direction 44 could correspond to the maximum extension 18 of conventional arrangements—for example approx. 500 mm—so that to the greatest extent possible all the variants of a cabin concept can be implemented with a single, standardised, arrangement 22 according to the invention. However, depending on the type of aircraft or vehicle, other extensions 18 ranging between the usual dimensions of approximately 25 mm to 500 m are also imaginable.

FIG. 6 shows an installed curtain rail 46 that comprises an essentially straight shape and is installed in three rails 26 by means of three screw-on points 48. In the embodiment shown, the curtain rail is installed in the cabin so as to be offset between two fixtures, so that the curtain rail 46 does not extend parallel to one of the edges 50 or 52 of the arrangement 22 according to the invention. The screw-on points 48 could be bodies of a shape that corresponds to that of the cross-sectional profiles of the rails 26 so that while they are held so as to be slidable in longitudinal direction of the rails 26 they can transfer a torsional moment to the rails 26, and during a screwing process cannot rotate relative to the rails 26. (See FIG. 6A.) Such bodies could, for example, comprise a bush or similar, each comprising a thread. Screws, studs or the like can be screwed into this thread, in order to, in this manner, fasten the curtain rail 46 to the arrangement 22 according to the invention. As a result of the screwing-on process a compressive force is exerted between the screw-on point 48 and the respective region of the curtain rail 46 so that as a result of this the screw-on points 48 situated in the arrangement 22 according to the invention, which arrangement 22 is situated in between, establish contact and thus become fastened. Fastening the screws of the curtain rail 46 with sufficient torque thus ensures safe holding. The curtain rails need not be of a straight design; they can also comprise curves or kinks or any other geometric shape as long as movement of the curtain gliders in the rails remains ensured.

FIGS. 7a to 7c show further installation situations that are imaginable depending on particular cabin configurations. In FIG. 7c, for example, two cabin fixtures are supplemented by a partition curtain that is arranged so as to be perpendicular to the direction of flight. Such fixtures can, for example, be two partition walls arranged opposite one another. In the other cases in FIGS. 7a and 7b the corresponding fixtures that are designed to be bridged by a partition curtain are arranged so as to be offset from one another, and consequently the respective curtain rail 46 needs to be screwed obliquely into the arrangement 22 according to the invention. However, FIGS. 7a to 7c show that with a corresponding design of the arrangement 22 according to the invention any installation situation relating to a corresponding cabin layout within the aircraft can be implemented.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

REFERENCE CHARACTERS

2 Arrangement for receiving a curtain rail (state of the art)
4 Overhead stowage compartment (hatrack)
6 Overhead stowage compartment (hatrack)
8 Bottom of the arrangement
10 Top of the arrangement
12 First face of the arrangement
14 Second face of the arrangement
16 Lateral extension of the arrangement
18 Extension in longitudinal direction of the arrangement
20 Thickness of the arrangement
22 Arrangement according to the invention for receiving a curtain rail
24 Bottom of the arrangement according to the invention
26 Rail
28 Extension, towards the cabin ceiling, of the arrangement according to the invention
30 Top of the arrangement according to the invention
32 Sealing lip
34 Sidewall
36 Sidewall
38 Hollow space
40 Cover panel
42 Width of the arrangement according to the invention
44 Extension, in longitudinal direction, of the arrangement according to the invention
46 Curtain rail
48 Screw-on point
50 First edge of the arrangement according to the invention
52 Second edge of the arrangement according to the invention
54 aircraft
49 elongated holes
47 fasteners
60 cabin ceiling
62 passage region

The invention claimed is:

1. A partitioning arrangement for installation in a vehicle cabin, comprising:
   a horizontal portion having a substantially planar bottom surface;
      wherein the horizontal portion further comprises a plurality of parallel rails located on the bottom surface;
      wherein each of the rails comprises an attachment element slideable within the rail;
   a generally vertical wall extending from an upper surface of the horizontal portion;
      wherein the vertical wall is perpendicular to a plurality of longitudinal axes of the rails;
      wherein the vertical wall extends from the upper surface of the horizontal portion to a ceiling of the vehicle cabin when the arrangement is installed;
   a curtain rail configured to receive a curtain for partitioning at least two regions in the vehicle cabin;
      wherein the curtain rail is attached to the slideable attachment elements with fasteners; and
      wherein the curtain rail is configured to be fastened to the slideable attachment elements such that the curtain rail is perpendicular to or at an oblique angle to the plurality of rails.

2. The partitioning arrangement of claim 1, wherein the slideable attachment elements are configured as bodies having threaded screw-on points; and
   wherein the bodies are shaped to correspond to cross-sectional profiles of the rails such that the bodies are slideable along the longitudinal axes and transfer a torsional moment to the rails.

3. The partitioning arrangement of claim 1, wherein the vertical portion comprises first and second vertical walls spaced apart from one another on the horizontal portion, thereby defining a hollow space there between.

4. The partitioning arrangement of claim 1, wherein the vertical wall comprises a sealing element between an upper portion of the wall and the vehicle ceiling; and
   wherein the sealing element conforms to the shape of the cabin ceiling.

5. The partitioning arrangement of claim 3, wherein each of the vertical walls comprises a sealing element between an upper portion of the wall and the vehicle ceiling; and wherein the sealing element conforms to the shape of the cabin ceiling.

6. The partitioning arrangement of claim 1, wherein the curtain rail comprises a plurality of elongated holes for fastening the curtain rail to the attachment elements.

7. An aircraft comprising the partitioning arrangement of claim 1, wherein the arrangement is placed in a passage region within the cabin and positioned such that the plurality of rails are aligned with a direction of flight of the aircraft.

\* \* \* \* \*